United States Patent
Jeong et al.

(10) Patent No.: US 9,755,784 B2
(45) Date of Patent: Sep. 5, 2017

(54) RECEIVER AND DECODING METHOD THEREOF

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Hong-sil Jeong, Suwon-si (KR); Sang-hyo Kim, Seongnam-si (KR); Jong-hwan Kim, Suwon-si (KR); Hyun-jae Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 15/083,546

(22) Filed: Mar. 29, 2016

(65) Prior Publication Data

US 2017/0093527 A1    Mar. 30, 2017

(30) Foreign Application Priority Data

Sep. 25, 2015   (KR) .................. 10-2015-0136726

(51) Int. Cl.
 *H04L 1/00* (2006.01)
 *H04L 27/22* (2006.01)

(52) U.S. Cl.
 CPC .......... *H04L 1/0054* (2013.01); *H04L 1/0048* (2013.01); *H04L 27/22* (2013.01)

(58) Field of Classification Search
 CPC ....... H04B 1/10; H04B 1/1027; H04L 1/0045; H04L 1/0047; H04L 1/005; H04L 1/0054; H04L 27/22; H04L 1/0048; H04J 11/0023; H04J 11/0026; H04J 11/0036; H04J 11/005; H04J 11/0056
 (Continued)

(56) References Cited

U.S. PATENT DOCUMENTS 7,876,784 B1    1/2011  Lee
2004/0216028 A1*  10/2004  Fukuhara ............... H04N 19/63
                                                    714/776

(Continued)

FOREIGN PATENT DOCUMENTS

CN         102820938 A    12/2012

OTHER PUBLICATIONS

Communication dated Jul. 22, 2016, issued by the International Searching Authority in counterpart International Application No. PCT/KR2016/003374 (PCT/ISA/210 & 237).

(Continued)

*Primary Examiner* — Young T Tse
(74) *Attorney, Agent, or Firm* — Sughrue Mion, PLLC

(57) ABSTRACT

A receiver is provided, which includes an antenna configured to receive a plurality of superposition coded signals from a plurality of base stations; and a signal processor configured to perform decoding of a plurality of layer signals included in the superposition coded signals by decoding an uppermost layer signal among the layer signals through applying Gaussian approximation only to remaining layer signals except an upper layer signal which is a next uppermost layer signal among the layer signals.

14 Claims, 9 Drawing Sheets

(58) Field of Classification Search
USPC ....... 375/224, 225, 227, 259–262, 265, 267; 370/208, 210, 310, 328, 342, 343, 345
See application file for complete search history.

(56) References Cited

U.S. PATENT DOCUMENTS

2006/0259636 A1* 11/2006 Laakkonen ............. H04L 12/24
    709/230
2009/0148054 A1* 6/2009 Kim ....................... H04N 19/61
    382/232

OTHER PUBLICATIONS

Dapeng Hao et al., "Superposition Modulation with Reliability-Based Hybrid Detection", 2010 6th International Symposium on Turbo Codes & Iterative Information Processing, Sep. 6-10, 2010, Total 7 pages.

Keying Wu et al., "A Quasi-Random Approach to Space-Time Codes", IEEE Transactions on Information Theory, vol. 54, No. 3, Mar. 2008, Total 15 pages.

S. Vanka et al., "Superposition Coding Strategies: Design and Experimental Evaluation", IEEE Transactions on Wireless Communications, vol. 11, No. 7, Jul. 2012, Total 14 pages.

* cited by examiner

… (1)

RECEIVER AND DECODING METHOD THEREOF

CROSS-REFERENCE TO THE RELATED APPLICATION

This application claims priority from Korean Patent Application No. 10-2015-0136726 filed on Sep. 25, 2015 in the Korean Intellectual Property Office, the disclosure of which is incorporated herein by reference in its entirety.

BACKGROUND

1. Field

Apparatuses and methods consistent with exemplary embodiments relate to a receiver and a decoding method thereof, and more particularly, to a receiver and a decoding method thereof, which can receive and decode a signal that is generated by superposition coding.

2. Description of the Related Art

In the case of receiving and decoding a signal that is generated by superposition coding technology, receivers in the related art perform decoding through a successive cancellation (SC) method.

The SC method is a method to successively decode and cancel superimposed signals in the order of their decoding success rates, and generally performs decoding and cancellation of an upper layer signal having high signal power first. For example, as shown in FIG. 1, the SC method may first decode a layer-1 signal, cancel the decoded layer-1 signal from a superposition coded signal (or a superposition coding signal), and then repeat the same process with respect to a layer-2 signal.

On the other hand, in the case of performing decoding through the SC method, the remaining residual signals, excluding a signal to be decoded, may act as interference signals. Accordingly, in order to reduce calculation complexity due to the interference signals, Gaussian approximation is applied to approximate the interference signals to Gaussian noises in performing the decoding process.

For example, as shown in FIG. 2, in the case of performing decoding of an uppermost layer signal, the uppermost layer signal is decoded through approximation of the remaining layer signals (i.e., layer-3 signal (upper signal) and layer-2 and layer-4 signals (lower signals)) to Gaussian noises.

However, in the case of applying the Gaussian approximation, a difference between an actual signal and the approximated signal may occur, and this may cause decoding performance to deteriorate.

In particular, in the case of applying the Gaussian approximation to a signal to which a QPSK (Quadrature Phase Shift Keying) modulation method is applied, a great difference occurs between the actual signal and the approximated signal in comparison to other high-order modulation methods. In this case, since the upper layer signal of the superposition coded signals is modulated in the QPSK method, greater performance deterioration may occur when the first signal is decoded.

Accordingly, there is a need for schemes to address the decoding performance deterioration due to the Gaussian approximation when the first signal is decoded.

SUMMARY

Exemplary embodiments of the inventive concept may or may not overcome the above disadvantages and other disadvantages not described above.

According to an aspect of an exemplary embodiment, there is provided a receiver which may include: an antenna configured to receive superposition coded signals from a plurality of base stations; and a signal processor configured to perform decoding of a plurality of layer signals included in the superposition coded signals by decoding an uppermost layer signal among the layer signals through applying Gaussian approximation only to remaining layer signals except an upper layer signal which is a next uppermost layer signal among the layer signals. The signal processor may process the upper layer signal as received from at least one of the base stations as an interference signal without performing the Gaussian approximation to the upper layer signal, and perform decoding of the upper layer signal through applying the Gaussian approximation to the remaining layer signals except the upper layer signal.

The uppermost layer signal and the upper layer signal may be signals which are modulated according to a QPSK method.

The signal processor may calculate a Log Likelihood Ratio (LLR) for decoding the uppermost layer signal based on Equation 4.

According to an aspect another exemplary embodiment, there is provided a decoding method of a receiver. The method may include: receiving a plurality of superposition coded signals from a plurality of base stations; and performing decoding of a plurality of layer signals included in the superposition coded signals by decoding an uppermost layer signal among the layer signals through applying Gaussian approximation only to remaining layer signals except an upper layer signal which is a next uppermost layer signal among the layer signals.

The uppermost layer signal and the upper layer signal may be signals which are modulated according to a QPSK method.

The decoding the uppermost layer signal may calculate calculating an LLR for decoding the uppermost layer signal based on Equation 4, and decoding the uppermost layer signal based on the LLR.

According to various exemplary embodiments, a superior decoding success rate can be achieved with respect to the superposition coded signals in the environment of multiple base stations.

Additional and/or other aspects and advantages of the inventive concept will be set forth in part in the description of the exemplary embodiments which follows and, in part, will be obvious from these embodiments, or may be learned by practice of these embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Hereinafter, various exemplary embodiments of the inventive concept will be described with reference to the accompanying drawings.

A receiver according to an exemplary embodiment may receive a superposition coded signal and generate or restore signals before being superimposed at a transmitter.

Here, the term "superposition coding" means a coding method to superimpose or overlap signals which contain the same or different data so that the signals have different powers. In this case, in the superposition coded signal, a signal having a relatively high power may form an upper layer, and a signal having a relatively low power may form a base layer (or a lower layer).

A transmitter (not illustrated) may generate a superposition coded signal and transmit the generated superposition coded signal to a receiver through a base station.

For example, the transmitter may generate an upper layer signal and a base layer signal through encoding and modulating of bits (i.e., payload or message), adjust their powers, and then superimpose the upper layer signal and the base layer signal to generate a superposition coded signal.

Figure 1:
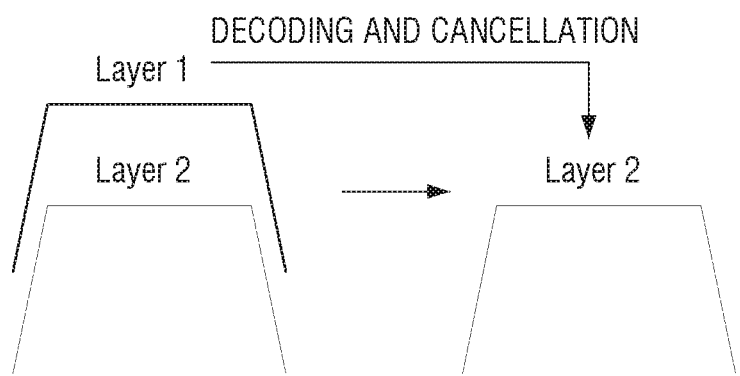
FIGS. 1 and 2 are diagrams explaining a method for decoding superposition coded signals in a successive cancellation (SC) method.
Figure 2:
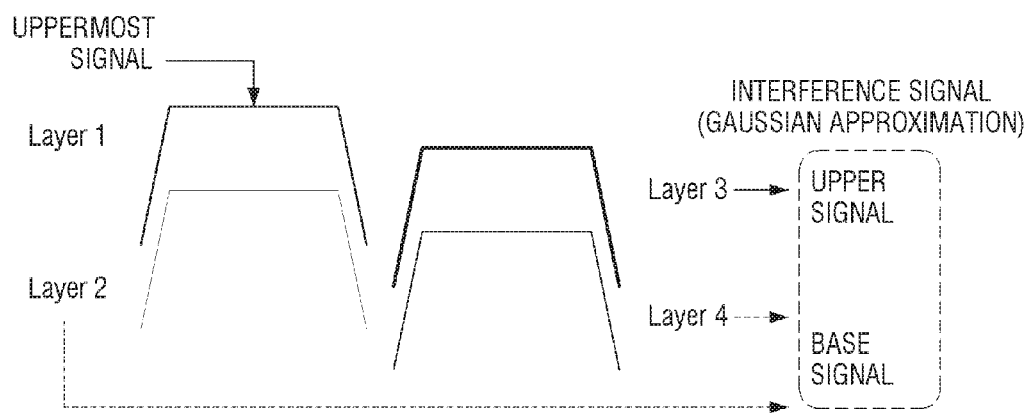
Figure 3:
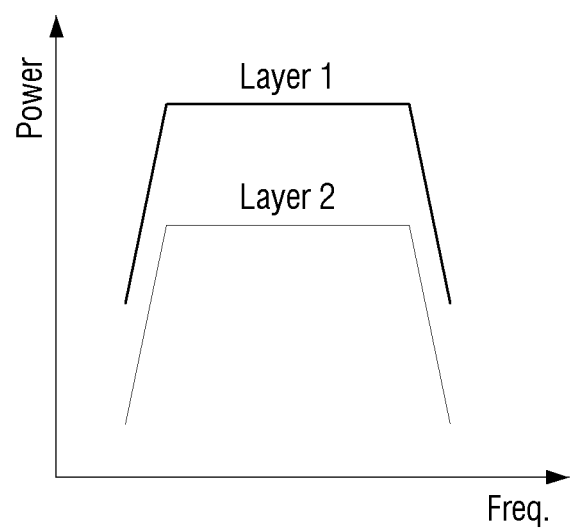
FIG. 3 is a diagram illustrating an example of superposition coded signals according to an exemplary embodiment.

In this case, the generated superposition coded signal may appear as shown in FIG. 3.

Referring to FIG. 3, a layer-1 signal (i.e., upper layer signal) that uses the same band with a layer-2 signal (i.e., a base layer signal) is transmitted with a power that is higher than the power of the layer-2 signal.

A receiver according to an exemplary embodiment may exist in an environment of multiple base stations. That is, the receiver may receive the superposition coded signal from the multiple base stations.

Figure 4:
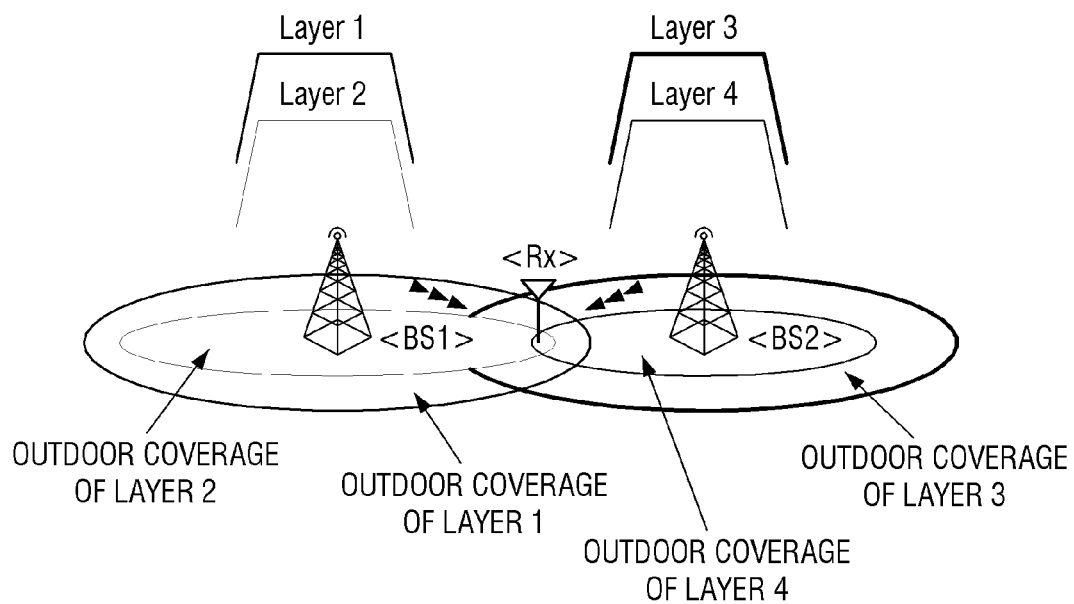
FIG. 4 is a diagram explaining an environment of multiple base stations according to an exemplary embodiment.

For example, as shown in FIG. 4, a receiver Rx may exist in a coverage of base station 1 (BS1) and base station 2 (BS2), and may receive a superposition coded signal that includes a layer-1 signal and a layer-2 signal from a base station 1 (BS1) and may receive a superposition coded signal that includes a layer-3 signal and a layer-4 signal from a base station 2 (BS2). Accordingly, the receiver Rx may receive four layer signals in total.

Hereinafter, when the receiver receives superposition coded signals from the multiple base stations, a method for efficiently decoding the received superposition coded signals will be described in more detail.

Figure 5:
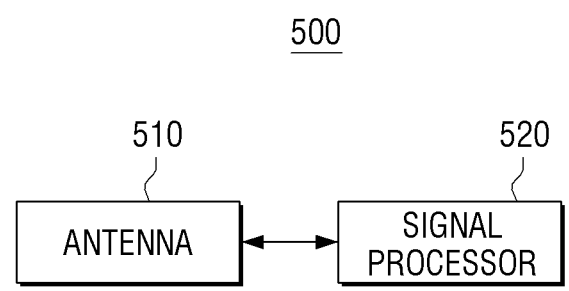
FIG. 5 is a block diagram illustrating the configuration of a receiver according to an exemplary embodiment.

FIG. 5 is a block diagram illustrating the configuration of a receiver according to an exemplary embodiment.

Referring to FIG. 5, a receiver 500 may include an antenna 510 and a signal processor 520.

The antenna 510 receives superposition coded signals from a plurality of base stations. That is, in the case where the receiver 500 exists in a coverage of the plurality of base stations, the antenna 510 may receive the superposition encoded signals that are transmitted from the respective base stations.

The signal processor 520 performs decoding of a plurality of layer signals that constitute the superposition coded signals received from the plurality of base stations.

When performing decoding of the uppermost layer signal among the plurality of layer signals, the signal processor 520 may perform decoding of an uppermost layer signal through applying Gaussian approximation only to the remaining layer signals except an upper layer signal that is a next uppermost layer signal.

That is, when performing decoding of the uppermost layer signal among the plurality of layer signals, the signal processor 520 may process the upper layer signal as a non-Gaussian signal without applying the Gaussian approximation thereto as Gaussian noise, and apply the Gaussian approximation to the other remaining layer signals to perform the decoding of the uppermost layer signal. Here, the non-Gaussian signal means a signal that has not been approximated as the Gaussian noise.

Hereinafter, a method for performing decoding of the uppermost layer signal will be described in more detail with reference to FIG. 6.

Figure 6:
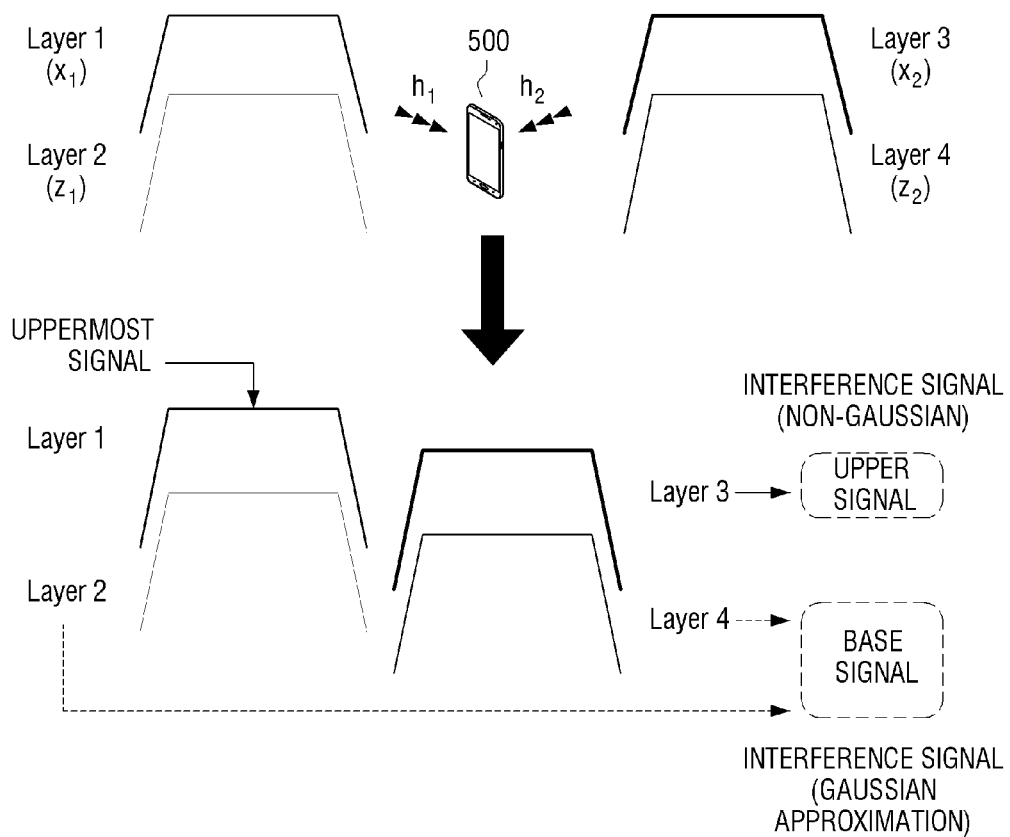
FIG. 6 is a diagram explaining a decoding method according to an exemplary embodiment.

Referring to FIG. 6, the receiver 500 receives a superposition coded signal that includes a layer-1 signal $x_1$ and a layer-2 signal $z_1$ from a base station 1 (not illustrated), and receives a superposition coded signal that is composed of a layer-3 signal $x_2$ and a layer-4 signal $z_2$ from a base station 2 (not illustrated).

In this case, the superposition coded signals (collectively, a signal y) that are received by the receiver 500 may be represented by $y=h_1(x_1+z_1)+h_2(x_2+z_2)+n$.

Here, $h_1$ denotes a fading channel between the base station 1 and the receiver 500, $h_2$ denotes a fading channel between the base station 2 and the receiver 500, and n denotes an AWGN (Additive White Gaussian Noise).

The signal processor 520 determines the uppermost layer signal among the plurality of layer signals that constitute the superposition coded signals received from the plurality of base stations.

Specifically, the signal processor 520 may determine reception powers of the plurality of layer signals that are included in the superposition coded signals, and determine a signal having the highest reception power as the uppermost layer signal among the plurality of layer signals.

For example, referring to FIG. 6, the signal processor 520 may determine the layer-1 signal $x_1$ having the highest reception power among the layer-1 signal $x_1$ and the layer-2 signal $z_1$, which are received from the base station 1 (not illustrated), and the layer-3 signal $x_2$ and the layer-4 signal $z_2$, which are received from the base station 2 (not illustrated), as the uppermost layer signal.

Thereafter, the signal processor 520 excludes the uppermost layer signal from the plurality of layer signals, and divides the remaining layer signals into an upper layer signal and base layer signals.

Specifically, the signal processor 520 may identify a layer signal having high reception power next to the uppermost layer signal as an upper layer signal, and identify the remaining layer signals except the upper layer signal as the base layer signals.

For example, referring to FIG. 6, the signal processor 520 may identify the layer-3 signal $x_2$ having high reception power next to the layer-1 signal $x_1$ as the upper layer signal, and identify the layer-2 signal $z_1$ and the layer-4 signal $z_2$ as the base layer signals.

When a superposition coded signal is composed of an upper layer signal and a base layer signal, and in general, the upper layer signal may be modulated according to a QPSK modulation method, and the base layer signal may be modulated according to a modulation method over 16-QAM.

Accordingly, as shown in FIG. 6, the uppermost layer signal (layer-1 signal) and the upper layer signal (layer-3 signal) may be signals that are modulated according to the QPSK method. Here, the uppermost layer signal is an upper signal of a superposition coded signal received from the base station 1, and the upper layer signal is also an upper layer signal of a superposition coded signal received from the base station 2.

The signal processor 520 calculates a Log Likelihood Ratio (LLR) of the uppermost layer signal for decoding the uppermost layer signal.

In this case, the signal processor 520 calculates the LLR of the uppermost layer signal through processing of the remaining layer signals except the uppermost layer signal as interference signals. Specifically, the signal processor 520 processes the base layer signal as a Gaussian noise through Gaussian approximation to consider the base layer signal as an interference signal, and processes the upper layer signal as received as an interference signal without performing Gaussian approximation to the upper layer signal.

Here, since the base layer signal is expressed as the Gaussian noise through the Gaussian approximation, the interference signal $I_{low}$ based on the base layer signal may be represented by Equations 1 and 2 below.

$$I_{low} = h_1 z_1 + h_2 z_2 \qquad (1)$$

$$\sigma^2 = \sigma_{I_{low}}^2 + \sigma_N^2 = h_1^2 \sigma_{z_1}^2 + h_2^2 \sigma_{z_2}^2 + \sigma_N^2 \qquad (2)$$

Here, $\sigma_N^2$ is variance of an Additive White Gaussian Noise (AWGN).

On the other hand, since the upper layer signal as received is considered as the interference signal without performing the Gaussian approximation, the interference signal $I_{up}$ ($=I_1$) based on the upper layer signal may be represented by Equation 3 below.

$$I_{up} = h_1 x_1 + h_2 x_2 \qquad (3)$$

As described above, since the upper layer signal as received is considered as the interference signal, the signal processor 520 may calculate the LLR for decoding the uppermost layer signal using two-dimensional Gaussian distribution as represented by Equation 4 below. Here, $u_{1j}$ means a j-th codeword of the uppermost layer signal $x_1$.

$$LLR(u_{1,j}) = \log \frac{\sum_{u_{1,j}=0} \sum_{x_2} Pr(y, x_1, x_2)}{\sum_{u_{1,j}=1} \sum_{x_2} Pr(y, x_1, x_2)} = \log \frac{\sum_{u_{1,j}=0} \sum_{x_2} Pr(y \mid x_1, x_2)}{\sum_{u_{1,j}=1} \sum_{x_2} Pr(y \mid x_1, x_2)} \qquad (4)$$

Here, $$Pr(y \mid x_1, x_2) = \frac{1}{\pi \sigma^2} \exp\left(-\frac{(Re(y) - Re(h_1 x_1 + h_2 x_2))^2 + (Im(y) - Im(h_1 x_1 + h_2 x_2))^2}{\sigma^2}\right)$$

Consequently, the signal processor 520 performs decoding of the uppermost layer signal based on the LLR that is calculated on the basis of above Equation 4.

For example, in the case where the transmitter (not illustrated) performs Low Density Parity Check (LDPC) coding, the signal processor 520 may perform LDPC decoding through iterative decoding based on a sum-product algorithm using the LLR, and restore bits that are transmitted from a transmitter (not illustrated) by determining bit values through soft decision.

Thereafter, the signal processor 520 may perform decoding of the remaining layer signals. In this case, the signal processor 520 may perform the decoding through processing the layer signals except the layer signal to be decoded as Gaussian noise.

First, the signal processor 520 may calculate an LLR of the upper layer signal based on a signal y' which is obtained by cancelling the decoded uppermost layer signal from the received signal y (that is, superposition coded signals from a plurality of base stations). Further, the signal processor 520 may perform decoding of the upper layer signal based on the calculated LLR.

Here, the signal y' may be represented by Equation 5 below, and the signal processor 520 may calculate the LLR of the upper layer signal based on Equation 6 below. Here, $u_{2j}$ means the j-th codeword of the upper layer signal $x_2$.

$$y' = y - h_1 x_1 \qquad (5)$$

$$LLR(u_{2,j}) = \log \frac{\sum_{u_{2,j}=0} Pr(y', x_2)}{\sum_{u_{2,j}=1} Pr(y', x_2)} = \log \frac{\sum_{u_{2,j}=0} Pr(y' \mid x_2)}{\sum_{u_{2,j}=1} Pr(y' \mid x_2)} \qquad (6)$$

$$= \log \frac{\sum_{u_{2,j}=0} \frac{1}{\sqrt{2\pi\sigma^2}} \exp\left(-\frac{(y' - h_2 x_2)^2}{2\sigma^2}\right)}{\sum_{u_{2,j}=1} \frac{1}{\sqrt{2\pi\sigma^2}} \exp\left(-\frac{(y' - h_2 x_2)^2}{2\sigma^2}\right)}$$

If the decoding of the uppermost layer signal and the upper layer signal is completed by the above-described method, the signal processor 520 may perform decoding of the base layer signal and the lowermost layer signal.

Here, the base layer signal may be one, which has a relatively high reception power, of two layer signals except the uppermost layer signal and the upper layer signal among the plurality of layer signals that constitute the superposition coded signals, and the lowermost layer signal may be the other, which has a relatively low reception power, of the two layer signals.

Specifically, the signal processor 520 may calculate an LLR of the base layer signal through processing the lowermost layer signal as the interference signal. In this case, the signal processor 520 may process the lowermost layer signal as the Gaussian noise through the Gaussian approximation, and the interference signal $I_{low}$ may be represented by Equations 7 and 6 below.

$$I_{low} = h_2 z_2 \qquad (7)$$

$$\sigma^2 = \sigma_{I_{low}}^2 + \sigma_N^2 = h_2^2 \sigma_{z_2}^2 + \sigma_N^2 \qquad (8)$$

That is, the signal processor 520 may calculate the LLR of the base layer signal based on a signal y" that is obtained by cancelling the decoded upper layer signal from the signal y'. Further, the signal processor 520 may perform decoding of the base layer signal based on the calculated LLR.

Here, the signal y" may be represented by Equation 9 below, and the signal processor 520 may calculate the LLR of the base layer signal based on Equation 10 below. Here, $v_{1j}$ means the j-th codeword of the base layer signal $z_1$.

$$y'' = y - h_2 x_2 \qquad (9)$$

-continued $$LLR(v_{1,j}) = \log \frac{\sum_{v_{1,j}=0} Pr(y'', z_1)}{\sum_{v_{1,j}=1} Pr(y'', z_1)} = \log \frac{\sum_{v_{1,j}=0} Pr(y'' \mid, z_1)}{\sum_{v_{1,j}=1} Pr(y'' \mid, z_1)} \quad (10)$$

$$= \log \frac{\sum_{v_{1,j}=0} \frac{1}{\sqrt{2\pi\sigma^2}} \exp\left(-\frac{(y'' - h_1 z_1)^2}{2\sigma^2}\right)}{\sum_{v_{1,j}=1} \frac{1}{\sqrt{2\pi\sigma^2}} \exp\left(-\frac{(y'' - h_1 x_1)^2}{2\sigma^2}\right)}$$

Further, the signal processor 520 may calculate an LLR of the lowermost layer signal based on a signal y''' that is obtained by cancelling the decoded base layer signal from the signal y''. Next, the signal processor 520 may perform decoding of the lowermost layer signal based on the calculated LLR.

Here, the signal y''' may be represented by Equation 11 below, and the signal processor 520 may calculate the LLR of the lowermost layer signal based on Equation 12 below. Here, $v_{2j}$ means the j-th codeword of the lowermost layer signal $z_2$.

$$y''' = y - h_1 x_1 \quad (11)$$

$$LLR(v_{2,j}) = \log \frac{\sum_{v_{2,j}=0} Pr(y''', z_2)}{\sum_{v_{2,j}=1} Pr(y''', z_2)} = \log \frac{\sum_{v_{2,j}=0} Pr(y''' \mid, z_2)}{\sum_{v_{2,j}=1} Pr(y''' \mid, z_2)} \quad (12)$$

$$= \log \frac{\sum_{v_{2,j}=0} \frac{1}{\sqrt{2\pi\sigma^2}} \exp\left(-\frac{(y''' - h_2 z_2)^2}{2\sigma^2}\right)}{\sum_{v_{2,j}=1} \frac{1}{\sqrt{2\pi\sigma^2}} \exp\left(-\frac{(y''' - h_2 z_2)^2}{2\sigma^2}\right)}$$

Here, $\sigma^2 = \sigma_N^2$

As described above, according to an exemplary embodiment, when performing decoding of the uppermost layer signal, the signal processor 520 calculates the LLR for decoding the uppermost layer signal through considering only the upper layer signal as the non-Gaussian signal, and thus complexity can be prevented.

Further, since the upper layer signal that is considered as the non-Gaussian signal is the signal that is modulated according to the QPSK method, it is possible to prevent the decoding performance from being deteriorated due to the great difference between the actual signal and the approximated signal when the Gaussian approximation is applied to the signal that is modulated according to the QPSK method.

Figure 7:
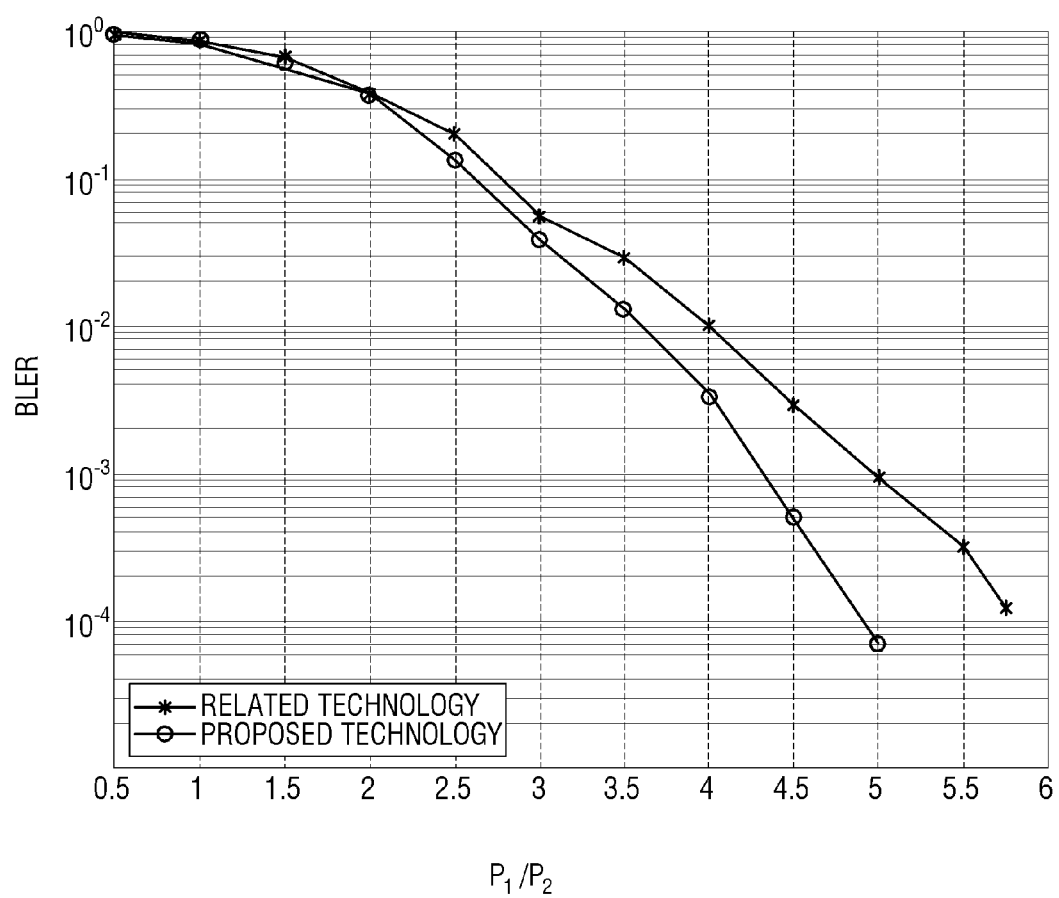
FIGS. 7 and 8 are diagrams illustrating the performance simulation results in the case where a decoding method according to an exemplary embodiment is used.
Figure 8:
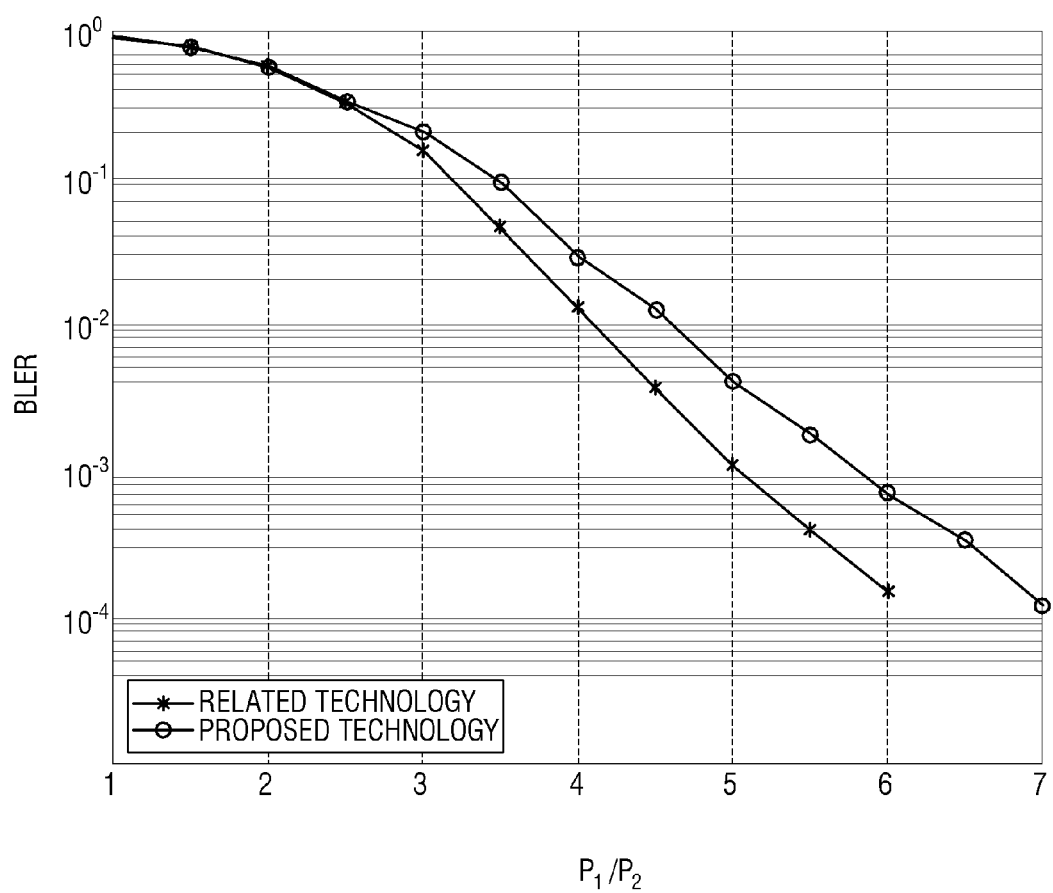

FIGS. 7 and 8 are diagrams illustrating performance simulation results in the case where a decoding method according to an exemplary embodiment is used.

It is assumed that during simulation, a receiver receives superposition coded signals each of which is composed of two layer signals from two base stations, and the superposition coded signals are transmitted through an Orthogonal Frequency Division Multiplexing (OFDM) modulation system. Further, it is assumed that a transmitter uses two LDPC codes having different code rates.

Detailed parameters are described in Table 1 below.

TABLE 1

|  |  | Fast Fourier Transform (FFT) Size | Modulation | Code Rate | LDPC Code Length | Injection Level |
|---|---|---|---|---|---|---|
| Exp. 1 | Layer 1 | 2048 | QPSK | 1/4 | 4096 | −3 dB |
|  | Layer 2 |  | 16-QAM | 2/3 | 8192 |  |
| Exp. 2 | Layer 1 | 2048 | QPSK | 1/4 | 3240 | −3 dB |
|  | Layer 2 |  | 16-QAM | 2/3 | 12960 |  |

Here, the term "injection level" means a power difference between layer signals constituting a superposition coded signal.

FIGS. 7 and 8 are graphs illustrating the results of performing simulations on the above-described conditions. In FIGS. 7 and 8, the y-axis represents the ratio of reception powers of the superposition coded signals that are received from base stations 1 and 2. $P_1$ denotes the power of the superposition coded signal that the receiver receives from the base station 1, and $P_2$ denotes the power of the superposition coded signal that the receiver receives from the base station 2.

Referring to FIGS. 7 and 8, it can be confirmed that, in the case of using the decoding method according to an exemplary embodiment, the decoding performance of the uppermost layer signal is improved to have a performance gain of 0.8 to 0.9 dB at BLER=$10^{-4}$ in comparison to the related art.

Figure 9:
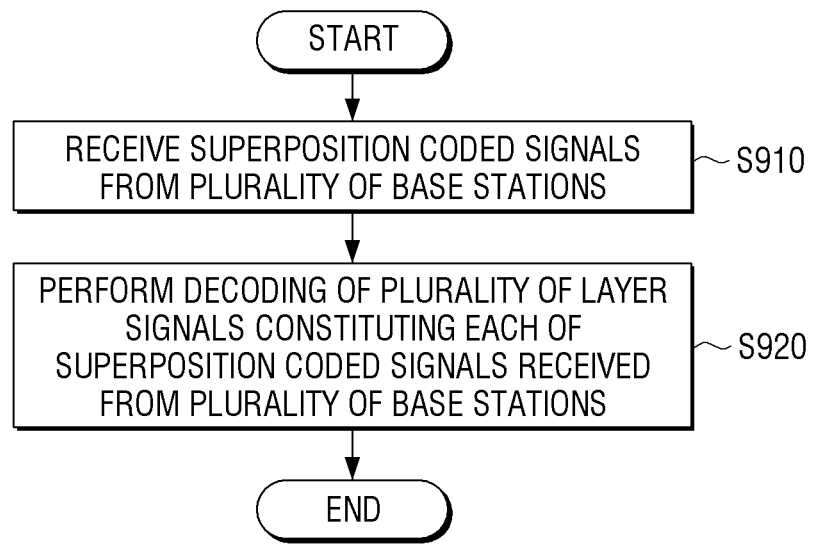
FIG. 9 is a flowchart explaining a decoding method according to an exemplary embodiment.

FIG. 9 is a flowchart explaining a decoding method according to an exemplary embodiment.

First, a plurality of superposition coded signals are received from a plurality of base stations (S910).

Then, decoding is performed with respect to a plurality of layer signals that constitute the superposition coded signals received from the plurality of base stations (S920).

Specifically, when performing decoding of the uppermost layer signal among the plurality of layer signals, the decoding may be performed with respect to the uppermost layer signal through applying Gaussian approximation only to the remaining layer signals except an upper layer signal that is a next uppermost layer signal.

Here, the uppermost layer signal and the upper layer signal may be signals that are modulated according to a QPSK method.

At S920, an LLR for decoding the uppermost layer signal may be calculated based on above-described Equation 4.

The operations or steps of the methods, algorithms or functions described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

The signal processor 520 of FIG. 5 may be embodied as various numbers of hardware, software and/or firmware structures that execute respective functions described above, according to an exemplary embodiment. For example, the signal processor 520 may use a direct circuit structure, such as a memory, processing, logic, a look-up table, etc. that may execute the respective functions through controls of one or more microprocessors or other control apparatuses. Also, the signal processor 520 may be specifically embodied by a module, a program, or a part of code, which contains one or more executable instructions for performing specified logic functions, and executed by one or more microprocessors or other control apparatuses. Also, the signal processor 520 may further include a processor such as a central processing unit (CPU) that performs the respective functions, a microprocessor, or the like. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments and advantages are merely exemplary and are not to be construed as limiting the inventive concept. The present teaching can be readily applied to other types of apparatuses. Also, the description of the exemplary embodiments is intended to be illustrative, and not to limit the scope of the inventive concept and the claims, and many alternatives, modifications, and variations will be apparent to those skilled in the art.

What is claimed is:

1. A receiver comprising:
   an antenna configured to receive a first superposition coded signal from a first base station and a second superposition coded signal from a second base station, wherein each of the first and second superposition coded signals is generated based on different layer signals; and
   a signal processor configured to decoded an uppermost layer signal from a plurality of layer signals of the first and second superposition coded signals by applying Gaussian approximation to remaining layer signals,
   wherein the remaining layer signals are layer signals except the uppermost layer signal and an upper layer signal among the plurality of layer signals, the upper layer signal being a next uppermost layer signal among the plurality of layer signals.

2. The receiver of claim 1, wherein the signal processor processes the upper layer signal as an interference signal without applying the Gaussian approximation to the upper layer signal.

3. The receiver of claim 2, wherein the signal processor further decodes the upper layer signal by applying the Gaussian approximation to the remaining layer signals except the upper layer signal.

4. The receiver of claim 3, wherein the signal processor calculates a log likelihood ratio (LLR) of the upper layer signal based on a signal which is obtained by cancelling the decoded uppermost layer signal from the plurality of layer signals, and decodes the upper layer signal based on the LLR of the upper layer signal.

5. The receiver of claim 4, wherein the signal processor further decodes the remaining signals except the upper layer signal.

6. The receiver as claimed in claim 1, wherein the uppermost layer signal and the upper layer signal are signals which are modulated according to a quadrature phase shift keying modulation scheme.

7. The receiver as claimed in claim 6, wherein the signal processor calculates a log likelihood ratio (LLR) of the uppermost layer signal based on, $$LLR(u_{1,j}) = \log \frac{\sum_{u_{1,j}=0} \sum_{x_2} Pr(y, x_1, x_2)}{\sum_{u_{1,j}=1} \sum_{x_2} Pr(y, x_1, x_2)} = \log \frac{\sum_{u_{1,j}=0} \sum_{x_2} Pr(y \mid x_1, x_2)}{\sum_{u_{1,j}=1} \sum_{x_2} Pr(y \mid x_1, x_2)},$$

where y denotes the first and second superposition coded signals received from the first and second base stations, $x_1$ denotes the uppermost layer signal, $x_2$ denotes the upper layer signal and Pr is a conditional probability function, and
   wherein the signal processor decodes the uppermost layer signal based on the LLR.

8. A decoding method of a receiver, the method comprising:
   receiving a first superposition coded signal from a first base station and a second superposition coded signal from a second base station; and
   decoding an uppermost layer signal from a plurality of layer signals of the first and second superposition coded signals by applying Gaussian approximation to remaining layer signals,
   wherein the remaining layer signals are layer signals except the uppermost layer signal and an upper layer signal among the plurality of layer signals, the upper layer signal being a next uppermost layer signal among the plurality of layer signals.

9. The method of claim 8, wherein the decoding the uppermost layer signal comprises processing the upper layer signal as an interference signal without applying the gaussian approximation to the upper layer signal.

10. The method of claim 9, further comprising decoding the upper layer signal by applying the Gaussian approximation to the remaining layer signals except the upper layer signal.

11. The method of claim 10, wherein the decoding the upper layer signal comprises calculating a log likelihood ratio (LLR) of the upper layer signal based on a signal which is obtained by cancelling the decoded uppermost layer signal from the plurality of layer signals, and decoding the upper layer signal based on the LLR of the upper layer signal.

12. The method of claim 11, further comprising decoding the remaining signals except the upper layer signal.

13. The method of claim 8, wherein the uppermost layer signal and the upper layer signal are signals which are modulated according to a quadrature phase shift keying modulation scheme.

14. The method of claim 13, wherein the decoding the uppermost layer signal comprises:
   calculating a log likelihood ratio (LLR) for decoding the uppermost layer signal based on, $$LLR(u_{1,j}) = \log \frac{\sum_{u_{1,j}=0} \sum_{x_2} Pr(y, x_1, x_2)}{\sum_{u_{1,j}=1} \sum_{x_2} Pr(y, x_1, x_2)} = \log \frac{\sum_{u_{1,j}=0} \sum_{x_2} Pr(y \mid x_1, x_2)}{\sum_{u_{1,j}=1} \sum_{x_2} Pr(y \mid x_1, x_2)},$$

where y denotes the first and second superposition coded signals received from the first and second base stations, $x_1$ denotes the uppermost layer signal, and $x_2$ denotes the upper layer signal and Pr is a conditional probability function; and decoding the uppermost layer signal based on the LLR.

* * * * *